US00RE48011E

(19) United States
(12) Reissued Patent
Simpson

(10) Patent Number: US RE48,011 E
(45) Date of Reissued Patent: May 26, 2020

(54) SCREW TYPE PUMP OR MOTOR

(71) Applicant: HiVis Pumps AS, Stavanger (NO)

(72) Inventor: Alastair Simpson, Hamilton (GB)

(73) Assignee: HIVIS PUMPS AS, Stavanger (NO)

(21) Appl. No.: 15/592,721

(22) Filed: May 11, 2017

Related U.S. Patent Documents

Reissue of:
(64) Patent No.: 9,382,800
Issued: Jul. 5, 2016
Appl. No.: 13/813,004
PCT Filed: Jul. 27, 2011
PCT No.: PCT/GB2011/051430
§ 371 (c)(1),
(2) Date: Jan. 29, 2013
PCT Pub. No.: WO2012/013973
PCT Pub. Date: Feb. 2, 2012

(30) Foreign Application Priority Data

Jul. 30, 2010 (GB) ..... 1012792.6

(51) Int. Cl.
*F01C 1/02* (2006.01)
*F04D 3/02* (2006.01)
(Continued)

(52) U.S. Cl.
CPC ..... *F04D 3/02* (2013.01); *F01C 1/0215* (2013.01); *F04D 5/002* (2013.01); *F04D 7/00* (2013.01); *F04D 29/688* (2013.01)

(58) Field of Classification Search
CPC ..... F01C 1/0215; F04D 3/02; F04D 5/002; F04D 7/00
(Continued)

(56) References Cited

U.S. PATENT DOCUMENTS 551,852 A * 12/1895 Desgoffe ..... 415/72 X
551,853 A 12/1895 Desgoffe
(Continued)

FOREIGN PATENT DOCUMENTS

DE 2311461 9/1974
FR 719967 2/1932
(Continued)

OTHER PUBLICATIONS

International Search Report issued in PCT/GB2011/051430 on Nov. 18, 2011.

*Primary Examiner* — Robert M Fetsuga
(74) *Attorney, Agent, or Firm* — Matthews, Lawson, McCutcheon & Joseph, PLLC

(57) ABSTRACT

A pump assembly comprising a stator and a rotor having vanes of opposite handed thread arrangements is described. A radial gap is located between the stator vanes and the rotor vanes such that rotation of the rotor causes the stator and rotor to co-operate to provide a system for moving fluid longitudinally between them. The operation of the pump results in a fluid seal being is formed across the radial gap. The described apparatus can also be operated as a motor assembly when a fluid is directed to move longitudinally between the stator and rotor. The presence of the fluid seal results in no deterioration of the pump or motor efficiency, even when the radial gap is significantly greater than normal working clearance values. Furthermore, the presence of the radial gap makes the pump/motor assembly ideal for deployment with high viscosity and/or multiphase fluids.

10 Claims, 12 Drawing Sheets

(51) Int. Cl.
*F04D 7/00* (2006.01)
*F04D 5/00* (2006.01)
*F04D 29/68* (2006.01)

(58) Field of Classification Search
USPC ..... 415/72, 75, 76, 199.4, 142, 901; 416/177; 166/105, 242.6; 384/226, 441, 384/901
See application file for complete search history.

(56) References Cited

U.S. PATENT DOCUMENTS 589,532 A * 9/1897 McCoskey ..... F04D 3/02 415/74
1,483,645 A * 2/1924 Sessions ..... F04D 29/167 277/322
1,624,466 A 4/1927 Black et al.
2,106,600 A 1/1938 Hepler
2,362,922 A 11/1944 Palm
2,362,992 A 11/1944 Dentzler, Jr.
3,077,932 A 2/1963 Gehrke
3,135,216 A 6/1964 Peterson
3,632,219 A 1/1972 Taylor
3,841,805 A * 10/1974 Zalis ..... B29C 47/0844 415/196
3,947,193 A 3/1976 Maurice
4,365,932 A 12/1982 Arnaudeau
4,386,654 A 6/1983 Becker
4,504,189 A 3/1985 Lings
4,614,232 A 9/1986 Jurgens et al.
4,645,413 A 2/1987 Reich
4,684,317 A 8/1987 Luijten et al.
4,708,586 A 11/1987 Sawada et al.
4,732,530 A 3/1988 Ueda et al.
4,826,393 A 5/1989 Miki
4,875,842 A 10/1989 Iida et al.
4,938,660 A 7/1990 Schoene et al.
4,997,352 A 3/1991 Fujiwara et al.
5,026,264 A 6/1991 Morozumi et al.
5,028,222 A 7/1991 Iida et al.
5,097,902 A 3/1992 Clark
5,120,204 A * 6/1992 Mathewson et al. ..... 418/48
5,163,827 A 11/1992 Sumida
5,275,238 A * 1/1994 Cameron ..... E21B 23/14 166/105
5,297,925 A 3/1994 Lee et al.
5,375,976 A 12/1994 Arnaudeau
5,549,451 A * 8/1996 Lyda, Jr. ..... 415/218.1
5,573,063 A 11/1996 Morrow
5,885,058 A 3/1999 Vilagines et al.
5,961,282 A 10/1999 Wittrisch et al.
6,041,855 A * 3/2000 Nistor ..... E21B 17/00 166/242.1
6,053,303 A * 4/2000 Wang ..... B65G 33/06 198/778
6,074,184 A 6/2000 Imai
6,210,103 B1 * 4/2001 Ramsay ..... 415/112
6,273,672 B1 8/2001 Charron
6,312,216 B1 11/2001 Falcimaigne
6,361,271 B1 * 3/2002 Bosley ..... F04D 5/002 415/72
6,382,919 B1 5/2002 Charron
6,419,444 B1 7/2002 Kabasawa et al.
6,454,547 B1 * 9/2002 Kohlhaas ..... F04D 3/02 417/353
6,547,514 B2 4/2003 Lee
6,595,746 B1 7/2003 Goto et al.
7,094,016 B1 8/2006 Zaher
8,506,236 B2 * 8/2013 Alison-Youel ..... F04D 29/181 415/183
2002/0114694 A1 8/2002 Teplanszky
2003/0147760 A1 8/2003 Chiang
2004/0258518 A1 12/2004 Buchanan
2007/0248454 A1 * 10/2007 Davis et al. ..... 415/74
2011/0046322 A1 * 2/2011 DePierri et al. ..... 526/64

FOREIGN PATENT DOCUMENTS

GB 804289 11/1958
GB 2083136 3/1982
GB 2237312 5/1991
GB 2239675 7/1991
WO WO 99/27256 * 6/1999
WO WO 99/27256 A 6/1999 ..... F04D 3/02
WO 00/43677 7/2000
WO 03/056137 7/2003
WO 2009/020386 2/2009

* cited by examiner

SCREW TYPE PUMP OR MOTOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is [the] *a reissue application of U.S. Pat. No. 9,382,800, issued on Jul. 5, 2016 from U.S. Non-provisional application Ser. No. 13/813,004, filed on Jan. 29, 2013, which was a* U.S. National Phase of International Application No. PCT/GB2011/051430 filed Jul. 27, 2011 which designated the U.S. and claims priority to GB Patent Application No. 1012792.6 filed Jul. 30, 2010, the entire contents of each of which are hereby incorporated by reference.

The present invention relates to the field of fluid pumps and motors. More specifically, the present invention concerns a pump assembly, or in reverse operation a motor, that finds particular application for use with high viscosity and/or multiphase fluids commonly found within the field of hydrocarbon exploration.

When exploring for hydrocarbons it is frequently required to provide artificial lift to a fluid e.g. when extracting oil from an oil bed it may be required to employ the assistance of a pump when the pressure of the oil deposit is insufficient to bring the oil to the surface. A number of pumps designs are known in the art and a brief summary of the most common types employed is provided below.

Progressing Cavity Pumps (PCP) or positive displacement pumps operate as a consequence of discrete void chambers, formed between a rotor and a stator, progressing along the pump as the rotor is rotated within the stator. Examples of such pumps and their applications can be found in U.S. Pat. Nos. 4,386,654 and 5,097,902.

The volumetric capacity of these pumps is a direct function of the void chamber volume, multiplied by the rate at which these void chambers progress along the length of the pump. The pump hydraulics follow similar principles which apply to piston type pumps. Typically, the stator of a PCP is manufactured from elastomers which make them vulnerable to heat, aromatics in crude oil and also limits the power that can be applied (due to waste heat generation, etc). PCPs are also less well suited for operation with gases or fluids containing solids. It is however known to reverse the operation of a PCP so that it may operate as a motor.

Centrifugal pumps operate by the rotation of a number of impellers at high speed so as to impart considerable radial speed (kinetic energy) to a fluid. The fluid is redirected back towards the rotating hub or shaft via a diffuser such that the diffuser acts to convert the kinetic energy caused by the impellers into potential energy (pressure/head) while directing the fluid back towards the central axis and into the inlet of the next impeller. This process may be repeated in multi-stage centrifugal pumps. Examples of such pumps and their applications can be found in U.S. Pat. Nos. 7,094,016 and 5,573,063.

Due to the inherent design of the centrifugal mechanism, a centrifugal pump will pump fluid in the same direction irrespective of the direction of rotation of the impellers. Centrifugal pumps are vulnerable to gas locking. Gas locking occurs when there is a high percentage of free gas within the vanes which causes the liquid and gas of the fluid being pumped to separate with a resultant decrease in the energy transfer efficiency. When enough gas has accumulated, the pump gas locks and prevents further fluid movement. Centrifugal pumps are also vulnerable to solid and erosion damage due to the tortuous path and sudden acceleration which is fundamental to the 'centrifugal' pumping hydraulic mechanism.

Axial or compressor pumps work, in their simplest form, like the propeller on a ship or an aircraft. In more sophisticated designs, they are employed in a similar manner to the fan at the front, or induction, end of a modern aircraft turbofan engines. Generally, they comprise a rotor with one or more helical vanes or blades formed on its outer surface which is housed within a cylindrical housing having a substantially smooth inner surface. As a result of this design these pumps are often referred to as single helix pumps and examples of such pumps and their applications can be found within U.S. Pat. Nos. 5,375,976; 5,163,827; 5,026,264; 4,997,352; 4,365,932; 2,106,600; and 1,624,466; UK patent nos. GB 2,239,675 and GB 804,289; and French Patent no. FR 719,967. The operation of an axial or compressor pump can be reversed so as to allow it to operate as a motor.

Dual-helix axial or compressor pumps share a number of common features with the above described axial or compressor pumps. The main difference in these pump designs is that as well as the rotor having one or more helical vanes formed on its outer surface the stator also comprises complementary helical vanes formed on its inner surface. Examples of such pumps and their applications can be found within U.S. Pat. Nos. 5,275,238 and 551,853; German patent publication no. DE 2,311,461; and PCT publication no. WO 99/27256.

The presence of the helical vanes on the stator introduces a number of operational differences when compared to axial or compressor pumps. In the first instance, dual-helix axial pumps exhibit an improved pump performance when compared with single-helix axial pumps. As a result of the dual-helix arrangement larger working clearances can be tolerated between the rotor and the stator than for single-helix axial pumps of comparable dimensions. Dual-helix axial pumps also provide a higher order of performance and efficiency over the top 60% of their theoretical operating range, where the top 60% is defined as the top 60% of the flow rate range at any particular operating speed.

The fluids commonly required to be artificially lifted during hydrocarbon exploration are often of high viscosity or multiphase in nature. A multiphase fluid is one that comprises a mixture of at least one gas phase or one liquid phase or a wide range of two or more of the following constituents:

(a) a gas phase;
(b) a liquid phase;
(c) a highly viscous phase;
(d) a steam vapour phase;
(e) entrained solids e.g. sand, scale, or organic deposits (potentially up to 60%).

The gas phase may be a mixture or hydrocarbon gas and non-hydrocarbon contaminants such as nitrogen and carbon dioxide.

The liquid phase may be a mixture of normal crude oil and water, the water may be produced water or water introduced into the well for other reasons.

The highly viscous phase may be heavy crude oil or extra heavy crude oil or emulsion or any of these with a high proportion of solids entrained such that the highly viscous material exhibits considerable plastic viscosity and/or very high gel strength.

In practice, current roto-dynamic pumps, including downhole oil well pumps, generally comprise a succession of several compression stages, typically five to fifteen stages, (but can be many more) each comprising a pump design as outlined above. However, when employed to pump high viscosity or multiphase fluids these pumps are found to be either incapable of operating or fail after only short periods of operation. This is particularly true when the multiphase fluid exhibits a high solid content or the contained solid particles are large.

Furthermore, if the multiphase fluid comprises a steam vapour phase then this adds an additional difficulty for conventional downhole pumps. For example, and as described above, the elastomers of conventional PCPs do not survive such high operating temperature. In addition, the prior art pumps can often become shock damaged by the propensity of the steam bubbles to collapse. Thus none of the known roto-dynamic pumps have the ability to compress and pump highly variable multiphase mixtures in a viable or effective manner; they are either ineffective, inefficient or damaged by the fluid conditions.

It is recognised in the present invention that considerable advantage is to be gained in the provision of a pump capable of pumping a high viscosity and/or multiphase fluid.

It is further recognised that considerable advantage is to be gained in the provision of a motor capable of being driven by a high viscosity and/or multiphase fluid.

It is therefore an object of an aspect of the present invention to obviate or at least mitigate the foregoing disadvantages of the pumps and motors known in the art for pumping high viscosity and/or multiphase fluids.

SUMMARY OF INVENTION

According to a first aspect of the present invention there is provided a pump assembly comprising a stator and a rotor, each one being provided with one or more vanes having an opposite handed thread with respect to the thread of the one or more vanes on the other and arranged such that a radial gap is located between the one or more stator vanes and the one or more rotor vanes, the stator and rotor co-operating to provide, on rotation of the rotor, a system for moving fluid longitudinally between them, wherein a fluid seal is formed across the radial gap.

According to a second aspect of the present invention there is provided a motor assembly comprising a stator and a rotor, each one being provided with one or more vanes having an opposite handed thread with respect to the thread of the one or more vanes on the other and arranged such that a radial gap is located between the one or more stator vanes and the one or more rotor vanes, the stator and rotor co-operating to provide, on fluid moving longitudinally between them, relative rotation of the rotor and stator, wherein a fluid seal is formed across the radial gap.

A radial gap greater than, or equal to, 0.254 mm may be provided between the one or more stator vanes and the one or more rotor vanes. Preferably, a radial gap greater than, or equal to, 1.28 mm is provided between the one or more stator vanes and the one or more rotor vanes.

The presence of the fluid seal results in no deterioration of the pump or motor efficiency even when the radial gap is significantly greater than 0.254 mm. Furthermore, the presence of the radial gap makes the pump/motor assembly ideal for deployment with high viscosity and/or multiphase fluids. Sediment and debris contained within a fluid will not get jammed between the rotor and stator but surprisingly the presence of the gap does not significantly reduce the efficiency of the device.

The radial gap may be in the range of 1.28 mm to 5 mm. Such embodiments are preferred when compressing a gas with a liquid fraction of not less than 5% liquid at the pump inlet. The radial gap may be in the range of 5 mm to 10 mm. Such embodiments are preferred when compressing and pumping gas with a liquid phase, a highly viscous fluid, a high solids content or large particles e.g. up to 10 mm in diameter.

The size of the radial gap may be configured to increase or decrease along the length of the assembly.

Preferably the rotor vanes are arranged on an external surface of the rotor so as to form one or more rotor channels. In a similar manner the stator vanes are arranged on an internal surface of the stator so as to form one or more stator channels.

Preferably a ratio of the volume to cross sectional area of the rotor channels is equal to, or greater than, 200 mm.

Preferably a ratio of the volume to cross sectional area of the stator channels is equal to, or greater than, 200 mm.

A helix formed by the rotor vanes may have a mean lead angle ($\alpha$) that is greater than 60° but less than 90°. It is however preferable for the mean lead angle ($\alpha$) to be in the range of 70° to 76°. In a preferred embodiment the mean lead angle ($\alpha$) is 73°.

A helix formed by the stator vanes may have a mean lead angle ($\beta$) that is greater than 60° but less than 90°. It is however preferable for the mean lead angle ($\beta$) to be in the range of 70° to 76°. In a preferred embodiment the mean lead angle ($\beta$) is 73°.

Most preferably a height of the one or more rotor vanes is greater than a height of the one or more stator vanes. A ratio of the rotor vane height to stator vane height may be in the range of 1.1 to 20. Preferably the ratio of the rotor vane height to the stator vane height is in the range 3.5 to 4.5. In a preferred embodiment the ratio of the rotor vane height to the stator vane height is 4.2.

A ratio of the rotor outer diameter to the rotor lead may be in the range of 0.5 to 1.5. In a preferred embodiment the ratio of the rotor outer diameter to the rotor lead is 1.0.

A ratio of the stator inner diameter to the stator lead may be in the range of 0.5 to infinity (stator lead =0) In a preferred embodiment the ratio of the stator inner diameter to the stator lead is 1.0.

One or more anti-rotation tabs may be located at each end of the stator.

The pump/motor assembly may further comprise a cylindrical housing within which the rotor and stator are located.

Optionally the rotor is connected to a motor by means of a central shaft such that operation of the motor induces relative rotation between the rotor and the stator.

The pump/motor assembly preferably comprises a first bearing which defines an inlet for the device. Preferably the pump/motor assembly further comprises a second bearing, longitudinally spaced from the first bearing, which defines an outlet for the device.

Most preferably a stator vane thickness is greater than a rotor vane thickness. Such an arrangement is found to significantly increase the operational lifetime of the pump/motor assembly.

The rotor may be coated with an erosion resistant, corrosion resistant and/or drag resistant coating. The stator may also be coated with an erosion resistant, corrosion resistant and/or drag resistant coating.

According to a third aspect of the present invention there is provided a multistage pump wherein the multistage pump comprises two or more pump assemblies in accordance with the first aspect of the present invention.

The one or more pump assemblies may be deployed on opposite sides of a central aperture. Fluid may therefore be drawn in through the central aperture and pumped to outlets located at opposite ends of the device.

The diameter of the two or more pump assemblies may differ along the length of the multistage pump. This provides a means for compensating for the effects of volume reduction due to the collapse of a gaseous phase as the pressure on the fluid is increased.

According to a fourth aspect of the present invention there is provided a multistage motor wherein the multistage motor comprises two or more motor assemblies in accordance with the second aspect of the present invention.

The one or more motor assemblies may be deployed on opposite sides of a central aperture. Fluid may therefore be drawn in through the central inlet so as to drive separate arms of the motor assembly.

According to a fifth aspect of the present invention there is provided a pump or motor assembly comprising a stator and a rotor, each one being provided with one or more vanes having an opposite handed thread with respect to the thread of the one or more vanes on the other, the stator and rotor co-operating to provide, on rotation of the rotor, a system for moving fluid longitudinally between them, wherein a thickness of the one or more stator vanes is greater than a thickness of the one or more rotor vanes.

Such an arrangement between the thickness of the one or more stator vanes and the thickness of the one or more rotor vanes is found to significantly increase the operational lifetime of the pump or motor assembly.

Optionally a radial gap greater than, or equal to, 0.254 mm is provided between the one or more stator vanes and the one or more rotor vanes. A radial gap greater than, or equal to, 1.28 mm may be provided between the one or more stator vanes and the one or more rotor vanes.

Embodiments of the fifth aspect of the invention may comprise preferred or optional features of the first to fourth aspects of the invention or vice versa.

According to a sixth aspect of the present invention there is provided a pump or motor assembly comprising a stator and a rotor, each one being provided with one or more vanes having an opposite handed thread with respect to the thread of the one or more vanes on the other, the stator and rotor co-operating to provide, on rotation of the rotor, a system for moving fluid longitudinally between them, wherein a height of the one or more rotor vanes is greater than a height of the one or more stator vanes.

Such an arrangement between the heights of the one or more rotor vanes and the heights of the one or more stator vanes is found to reduce the viscosity dependence of the performance of the pump.

The ratio of the rotor vane height to the stator vane height may be greater than or equal to 1.1. Optionally the ratio of the rotor vane height to the stator vane height is greater than or equal to 1.6. Optionally the ratio of the rotor vane height to the stator vane height is greater than or equal to 3.5.

Optionally a radial gap greater than, or equal to, 0.254 mm is provided between the one or more stator vanes and the one or more rotor vanes. A radial gap greater than, or equal to, 1.28 mm may be provided between the one or more stator vanes and the one or more rotor vanes.

Embodiments of the sixth aspect of the invention may comprise preferred or optional features of the first to fifth aspects of the invention or vice versa.

According to a seventh aspect of the present invention there is provided a method of pumping a multiphase or high viscosity fluid the method comprising the steps of:

selecting a radial gap between a stator and a rotor of a pump assembly depending on the composition of the fluid to be pumped;

selecting an operating speed for the pump assembly that is sufficient to provide a fluid seal across the radial gap.

The selected radial gap may be greater than or equal to 0.254 mm. Preferably the radial gap is greater than or equal to 1.28 mm. Optionally the radial gap is in the range of 1.28 mm to 5 mm. Alternatively, the radial gap is in the range of 5 mm to 10 mm.

The selected operating speed may be in the range of 500 rpm to 20,000 rpm. Preferably the operating speed is in the range of 500 rpm to 4,800 rpm.

Embodiments of the seventh aspect of the invention may comprise preferred or optional features of the first to sixth aspects of the invention or vice versa.

According to an eighth aspect of the present invention there is provided a pump assembly comprising a stator which is provided with one or more stator vanes, a rotor having a uniform diameter shaft which is provided with one or more rotor vanes, the rotor vanes and the stator vanes having an opposite handed thread such that the stator and rotor co-operate to provide, on rotation of the rotor, a system for moving fluid longitudinally between them, wherein a height of the one or more rotor vanes is greater than a height of the one or more stator vanes.

Embodiments of the eighth aspect of the invention may comprise preferred or optional features of the first to seventh aspects of the invention or vice versa.

BRIEF DESCRIPTION OF DRAWINGS

Aspects and advantages of the present invention will become apparent upon reading the following detailed description and upon reference to the following drawings in which.

Figure 3:
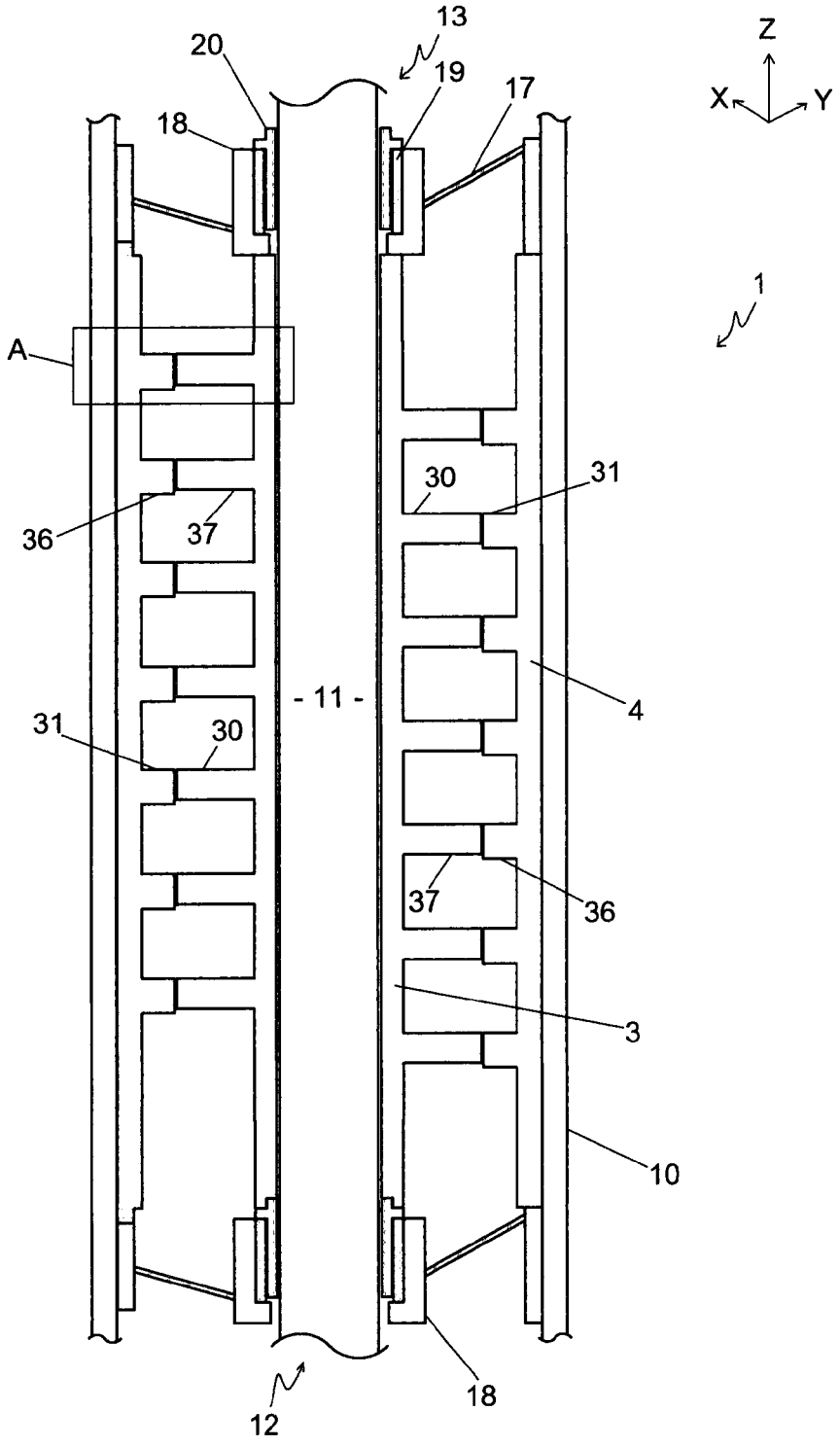
FIG. 3 presents a cross sectional assembled view of a pump assembly in accordance with an embodiment of the present invention.
Figure 6:
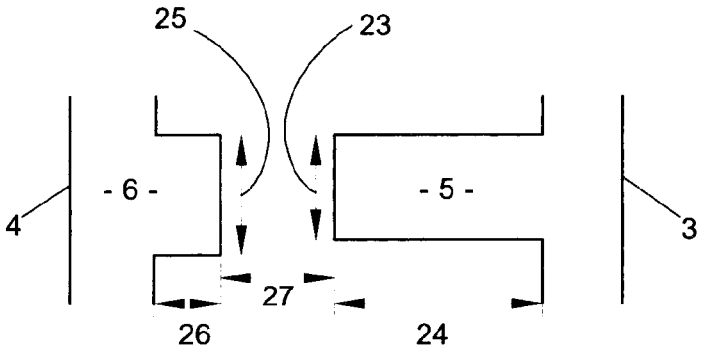
Figure 8:
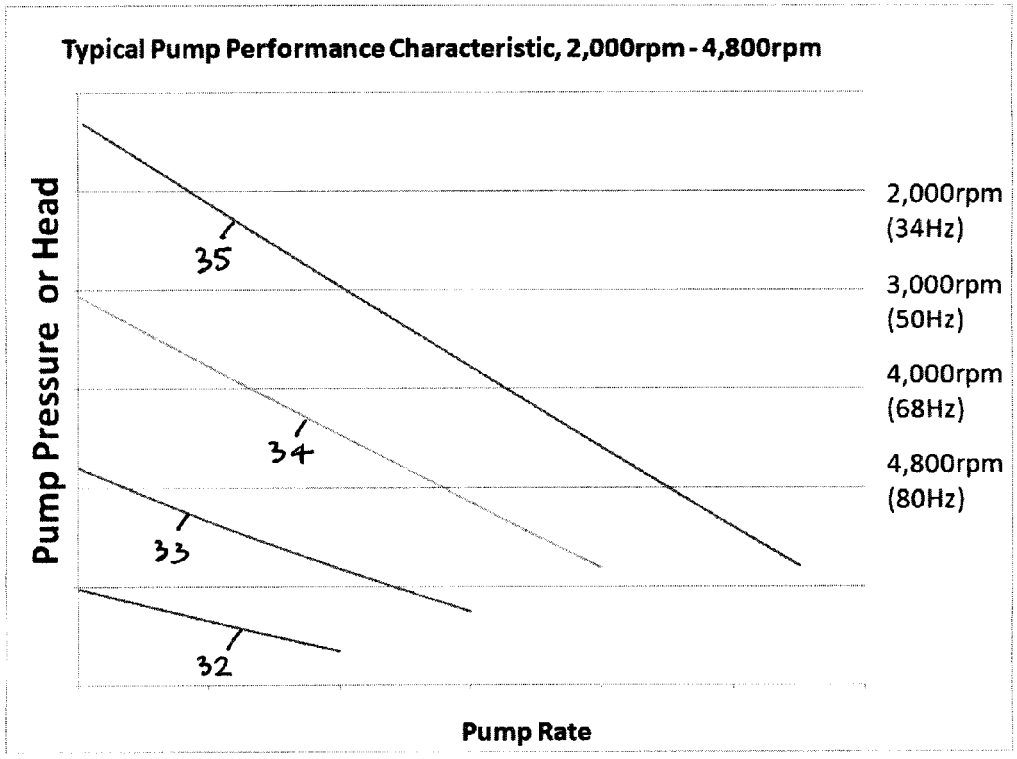

(a) an exploded view of a bearing for the pump assembly of FIG. 3; and (b) an exploded view of an alternative bearing for the pump assembly of FIG. 3;

FIG. 6 presents further detail of the region of the pump assembly marked A within FIG. 3;

FIG. 7 presents:

(a) a top view of the rotor;

(b) a side view of the rotor;

(c) a cross section view of the assembled rotor and stator assembly showing the fluid flow paths during operation of the pump assembly, and (d) a cross section view of the stator;

FIG. 8 presents four performance curves illustrating the pump rate or capacity versus pressure differential across the pump of FIG. 3 operating at 2,000 rpm, 3,000 rpm, 4,000 rpm and 4,800 rpm;

FIG. 9 presents three performance graphs illustrating the pump rate or capacity versus pressure differential across the pump of FIG. 3 for:

(a) a rotor vane height/stator vane height equal to 1.1;

(b) a rotor vane height/stator vane height equal to 1.6;

(c) a rotor vane height/stator vane height equal to 4.2.

Figure 10:
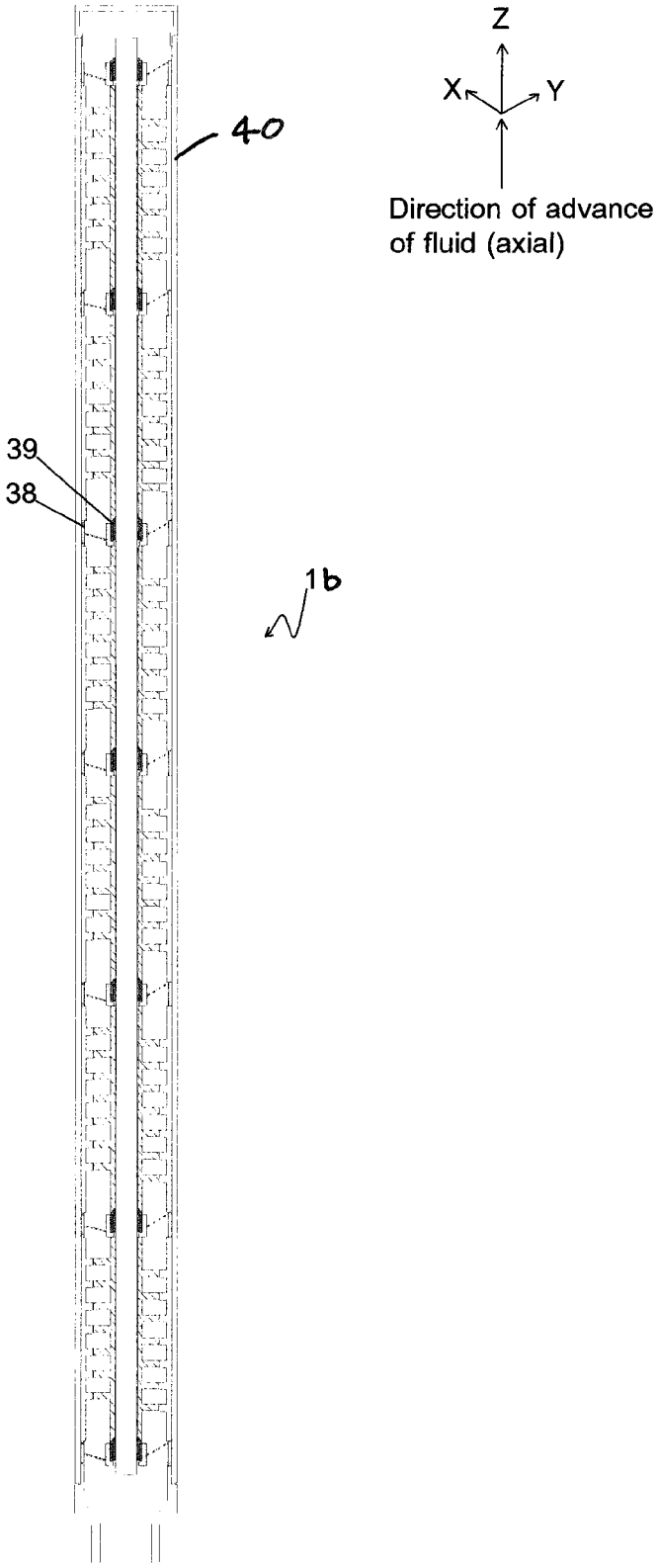
Figure 11:
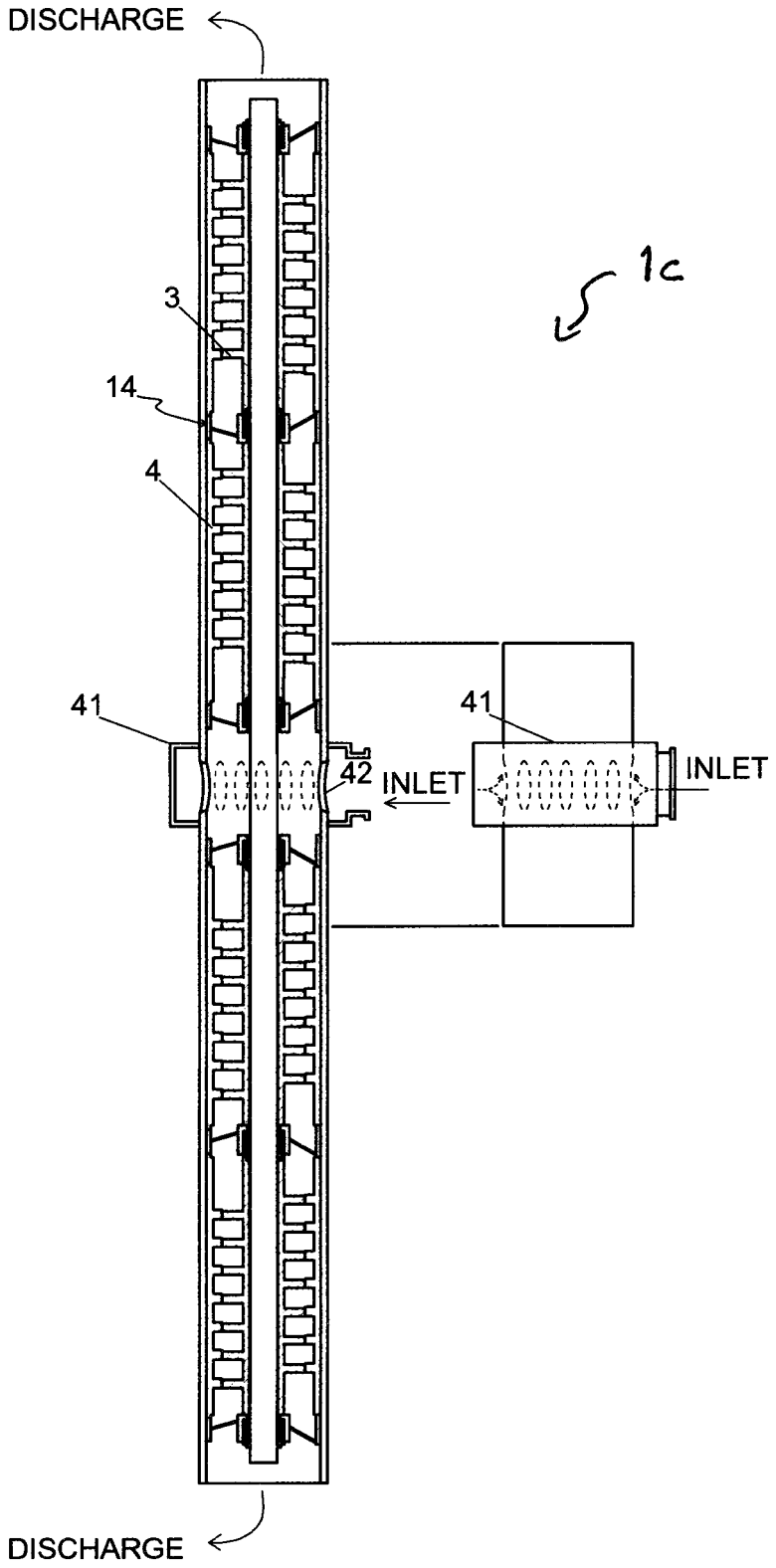
Figure 12:
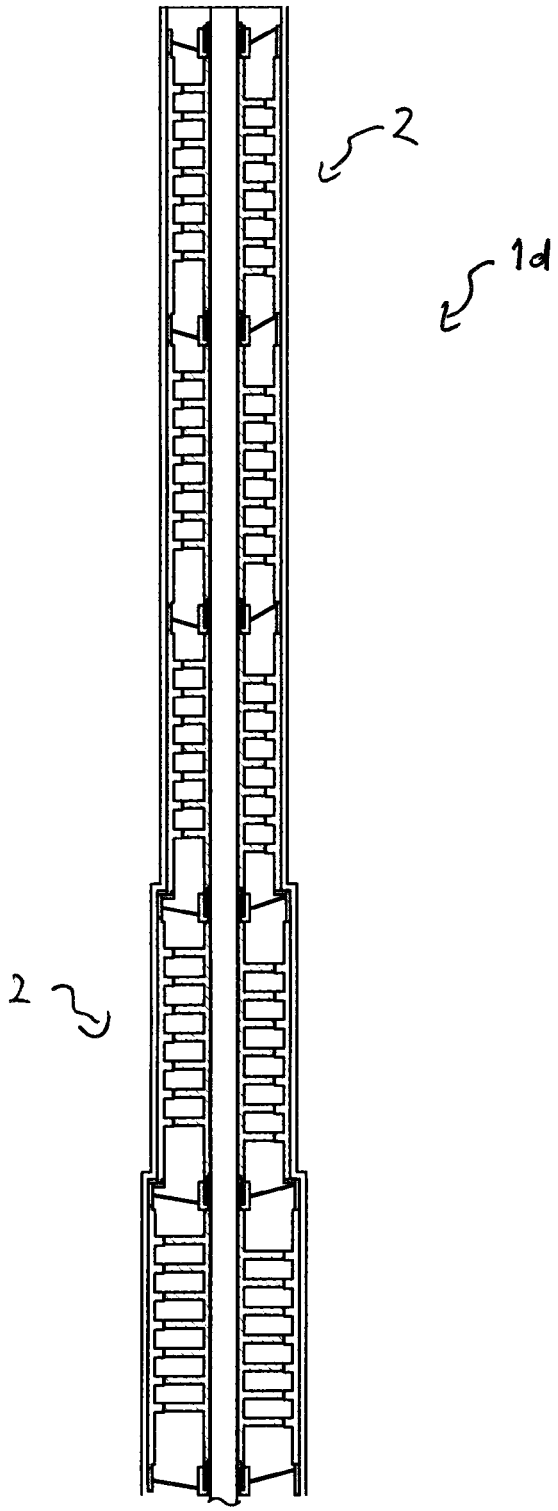

FIG. 10 presents a cross sectional assembled view of a multistage pump assembly in accordance with an embodiment of the present invention;

FIG. 11 presents a cross sectional assembled view of an alternative multistage pump assembly in accordance with an embodiment of the present invention; and FIG. 12 presents a cross sectional assembled view of a further alternative multistage pump assembly in accordance with an embodiment of the present invention.

DETAILED DESCRIPTION

A pump or motor assembly 1 in accordance with an embodiment of the present invention will now be described with reference to FIGS. 1 to 6.

Figure 1:
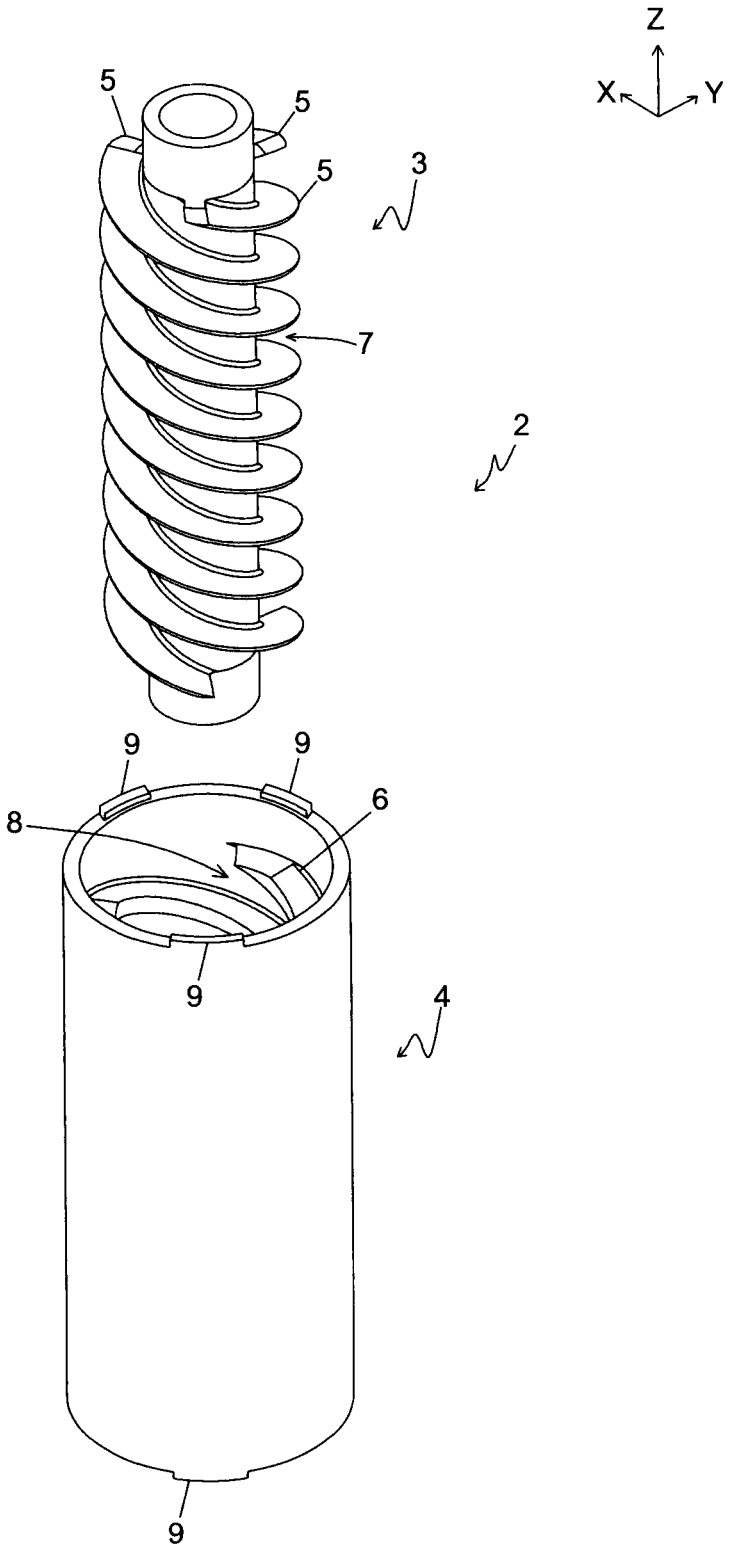
FIG. 1 presents an exploded view of a rotor and stator assembly of a pump assembly in accordance with an embodiment of the present invention.
Figure 2:
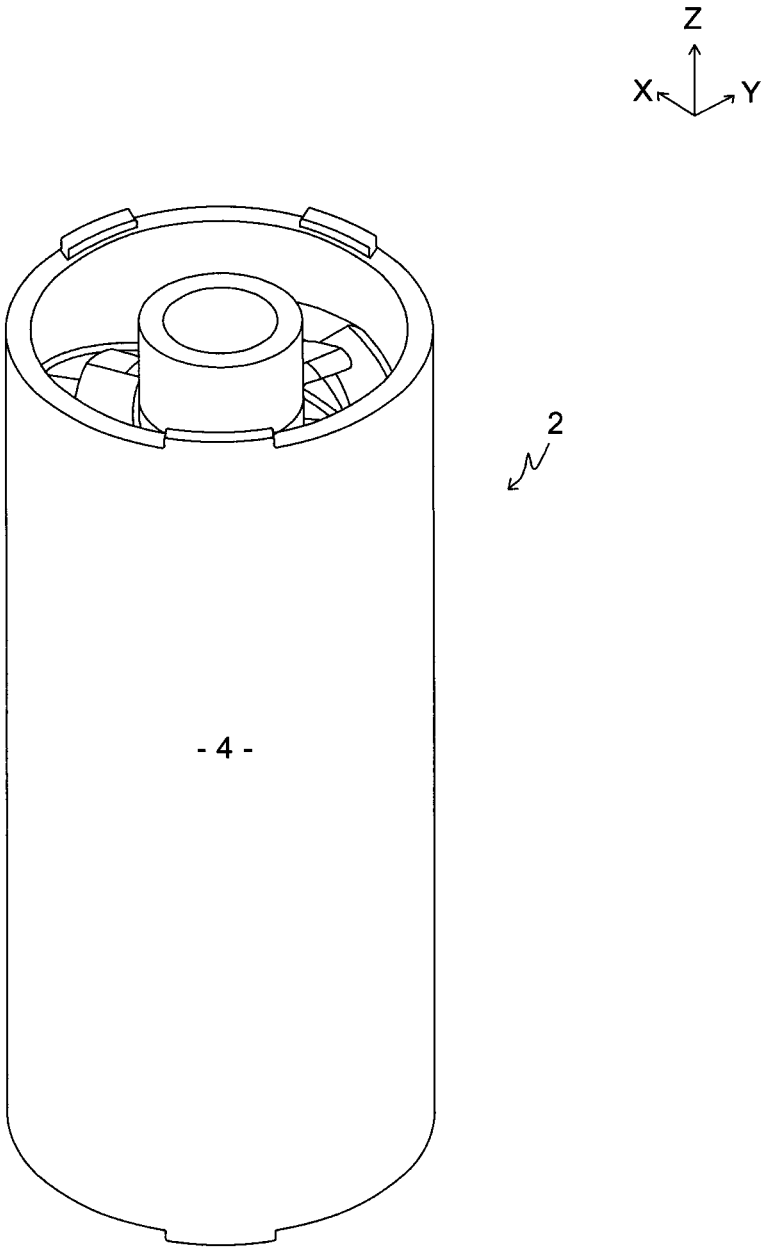
FIG. 2 presents an assembled view of the rotor and stator assembly of FIG. 1.

In particular, FIGS. 1 and 2 present exploded and assembled schematic views, respectively, of a rotor and stator assembly 2 of the pump assembly 1. The rotor and stator assembly 2 can be seen to comprise a rotor 3 which is surrounded by an annular stator 4 that is arranged to be coaxial with, and extend around, the rotor 3. The rotor 3 is externally screw-threaded in a right-handed sense by the provision of three rotor vanes 5 located on its external surface. The stator 4 is correspondingly internally screw-threaded in a left-handed sense through the provision of three stator vanes 6 located on its internal surface. The rotor vanes 5 and the stator vanes 6 are threaded so as to exhibit equal pitch and have radial heights such that they approach each other sufficiently closely so as to provide rotor channels 7 and stator channels 8 within which a fluid can be retained for longitudinal movement upon rotation of the rotor 3. In the presently described embodiment the rotor channels 7 are all of the same length and cross sectional area. Similarly, the stator channels 8 are all of the same length and cross sectional area.

Three anti-rotation tabs 9 are located at each end of the stator 4. The anti rotation tabs 9 provide a means for preventing rotation of any one component of the outer shell 15 of a bearing 14 and the rotor and stator assembly 2, or an entire bearing 14 and a rotor and stator assembly stack, due to operational reaction torque.

It will be appreciated by those skilled in the art that in alternative embodiments the number of rotor vanes 5 and or stator vanes 6 incorporated within the rotor and stator assembly 2 may be varied i.e. an alternative number of starts may be provided on the rotor 3 and or the stator 4. In a further alternative embodiment the threads of the rotor vanes 5 and the stator vanes 6 may be reversed i.e. the rotor 3 may be externally screw-threaded in a left-handed sense while the stator 4 is internally screw-threaded in a right-handed sense. In addition, it is the relative movement between the rotor 3 and the stator 4 that is important to the operation of the pump assembly 1. Thus in an alternative embodiment the pump assembly 1 may allow for the stator 4 to rotate about a fixed rotor 3.

Figure 4:
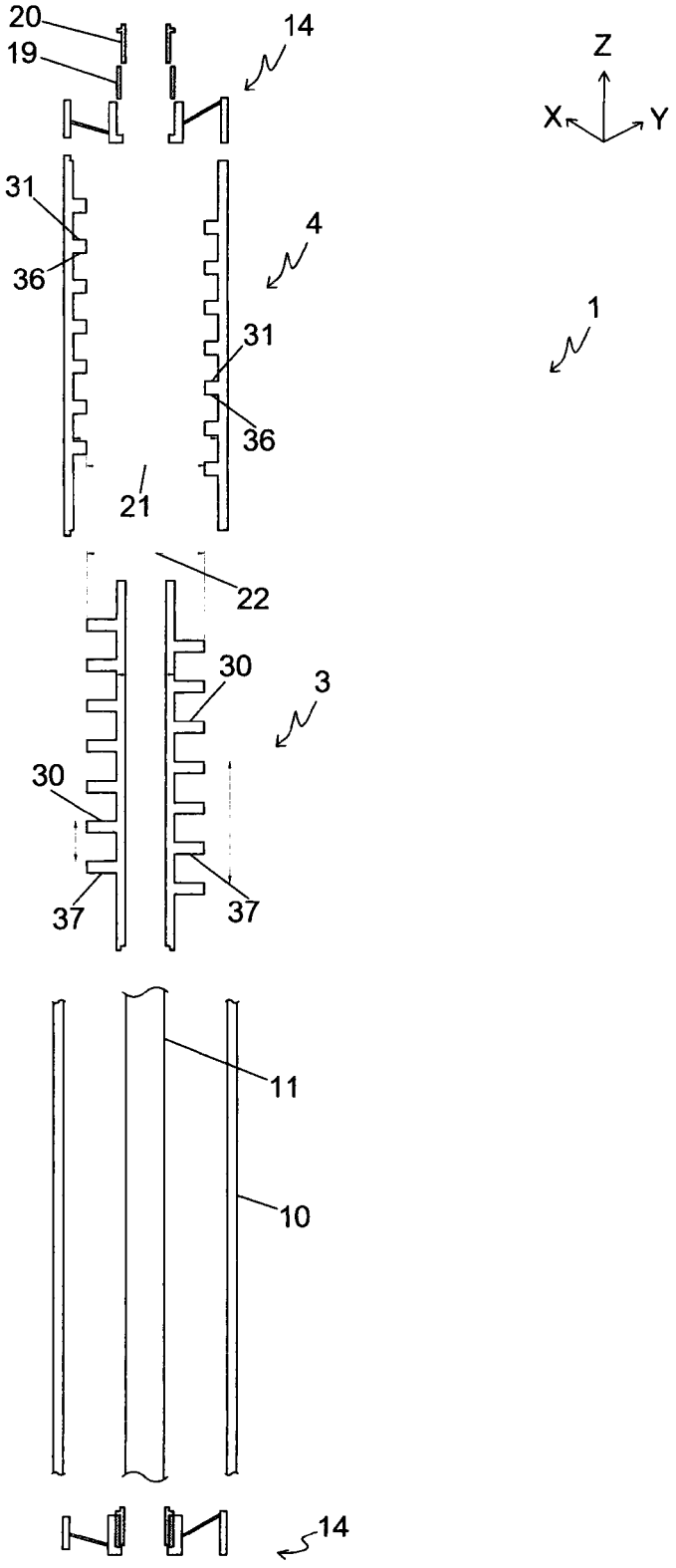
FIG. 4 presents a cross sectional exploded view of the pump assembly of FIG. 3.

Further detail of the pump assembly 1 is presented within FIGS. 3 to 6. In particular, FIG. 3 presents a cross-sectional assembled view of the pump assembly 1 while FIG. 4 presents an exploded view so as to highlight the individual components of the pump assembly 1. In addition to the previously described rotor and stator assembly 2, the pump assembly 1 can be seen to further comprise a cylindrical housing 10 within which the remaining components are located. The rotor 3 is connected to a motor (not shown) by means of a central shaft 11 such that operation of the motor induces relative rotation between the rotor 3 and the stator 4.

An inlet 12 and an outlet 13 of the pump assembly 1 are defined by the location of two bearings 14 separated along the longitudinal axis of the device. The bearings 14 assist in securing the rotor and the stator assembly 2 within the cylindrical housing 10 while reducing the effects of mechanical vibration thereon during normal operation. The inlet 12 and outlet 13 are obviously determined by the orientation in which the pump assembly 1 is operated i.e. with reference to FIG. 3 the fluid flow is substantially along the positive z-axis but can be reversed depending on whether the rotation of the rotor 3 is clockwise or anticlockwise.

Figure 5:
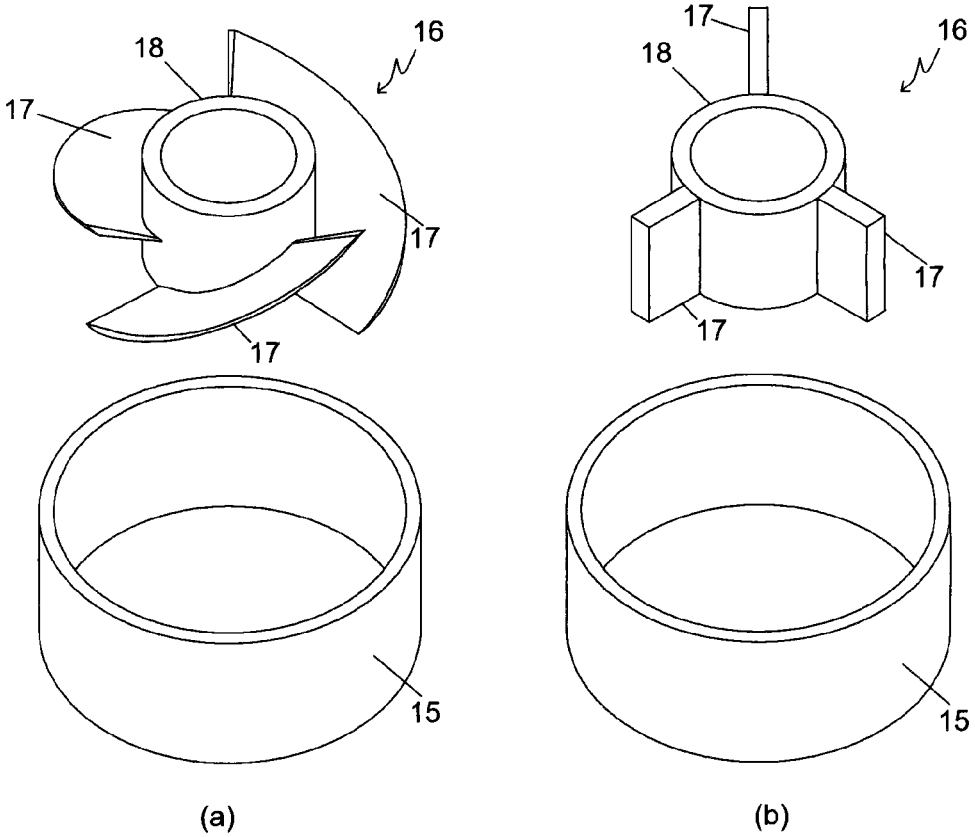
FIG. 5 presents.

The bearings 14 are employed to accommodate both radial loads from the central shaft 11 and thrust loads due to compressing or pumping fluids (in either direction). Further detail of the bearings 14 can be seen within the exploded views of FIG. 5. Each bearing 14 comprises an outer shell 15 which provides an interference fit with the internal diameter of the cylindrical housing 10. Located within the outer shell 15 is a bearing hub 16 that comprises three stationary support vanes 17 mounted upon a central support hub 18. The stationary support vanes 17 may be vertically orientated as shown in FIG. 5(b). Alternatively, the stationary support vanes 17 may be angled, as shown in FIG. 5(a) to align with the direction and angle of fluid flow at the inlet 12 and outlet 13 so as to minimise the effects of turbulence at these points. The stationary support vanes 17 may be angled in the range 10°-89° to the direction of the advancing fluid. Preferably the stationary support vanes 17 are angled in the range between 65° and 85° to the direction of advance of fluid. A stationary bushing 19 and a rotating bushing 20 are then located between the inner diameter of the central support hub 18 and the central drive shaft 11 of the pump assembly 1.

From FIG. 4 it can be seen that the internal diameter of the stator vanes 6 is denoted by the reference numeral 21 while the external diameter of the rotor vanes 5 is denoted by the reference numeral 22. FIG. 6 presents further detail of the area marked 'A' within FIG. 3 and is presented to provide clarity of understanding of a number of other physical parameters of the pump assembly 1. In particular, the thickness and the height of the rotor vanes are indicated by reference numerals 23 and 24, respectively, while the thickness and height of the stator vanes are indicated by reference numerals 25 and 26, respectively. As will become apparent from the following discussion, the radial gap, indicated by reference numeral 27, between the rotor vanes 5 and the stator vanes 6 performs an important function in the performance of embodiments of the pump assembly 1.

It is normal practice in the art to design the radial gap 27 so as to provide a working clearance between the rotor 3 and the stator 4. Therefore the radial gap 27 will typically be of the order of 0.254 mm. In the presently described embodiment the rotor 3 and stator 4 are designed such that there is a radial gap 27 greater than the normal working clearance e.g. the radial gap 27 may be of the order of 1.28 mm. It would be anticipated that introducing such a radial gap 27 would see a corresponding deterioration in the pump efficiency and performance of the pump assembly 1. Somewhat surprisingly, no significant drop off in the pump efficiency is found with such a size of radial gap 27. Indeed, radial gaps 27 of up to 10 mm have been incorporated within the pump assembly 1 without any significant deterioration in the pump efficiency being observed.

Figure 7:
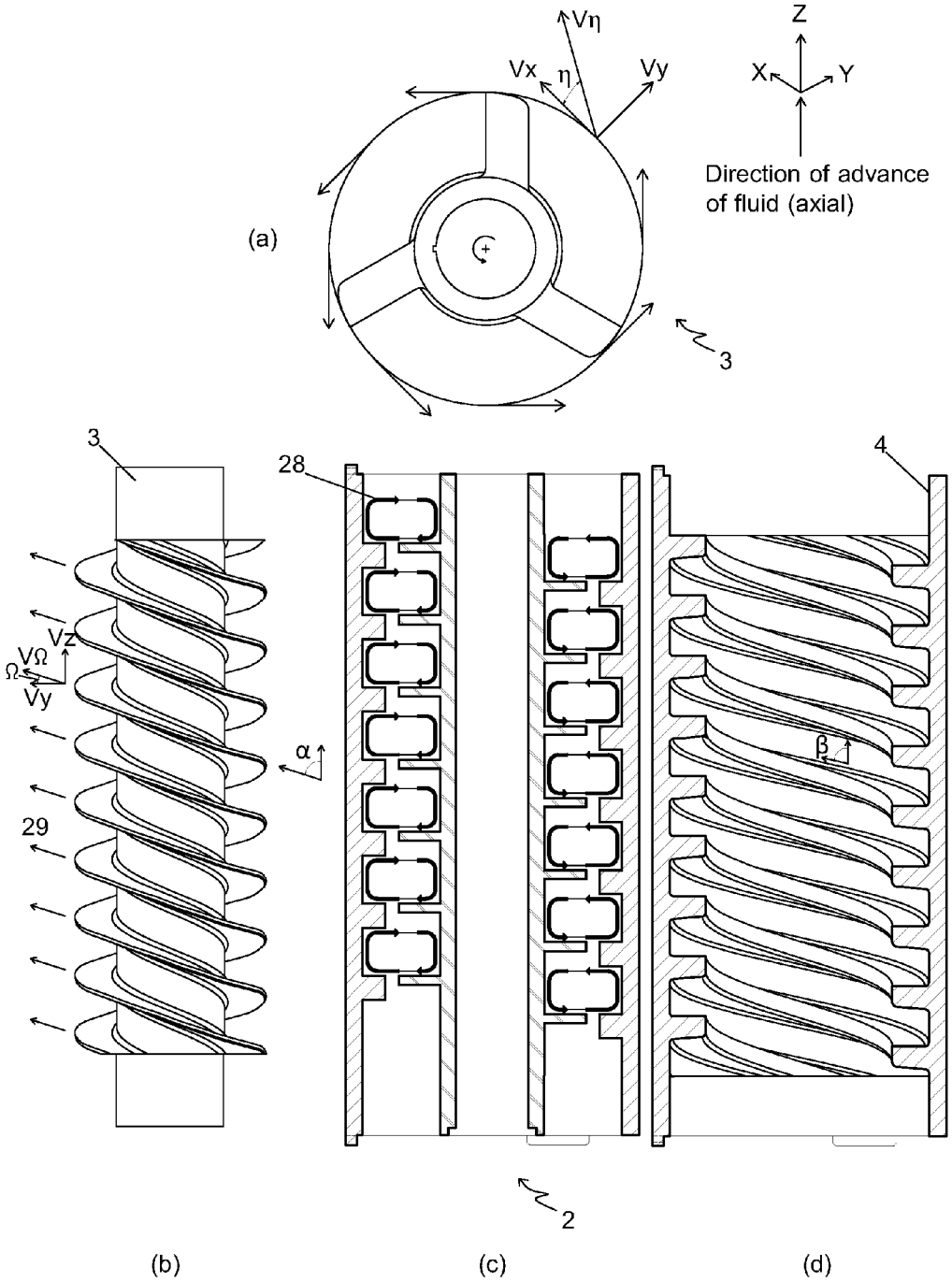

By way of explanation, FIGS. 7(a) and (b) present a top view and a side view of the rotor 3, respectively. FIG. 7(c) presents a schematic cross section view of the rotor and stator assembly 2 showing the fluid flow paths 28 believed to be taking place during the operation of the pump assembly 1. FIG. 7(d) presents a cross section view of the stator 4. The fluid flow path 28 generally follows the path of the rotor channels 7 and advances along the longitudinal axis of the assembly (i.e. in the positive z-axis). As the fluid spirals around the helical path a radial force is produced that acts upon the fluid flow causing a tangential fluid flow component 29 to be introduced (i.e. flow in the x-y plane). It is believed that this radial and tangential flow 29 of the fluid being pumped by the pump assembly effectively acts as a seal across the radial gap 27. As a result the pump assembly 1 is able to maintain pump efficiency and performance even though a not insignificant radial gap 27 is present. This mechanism has been confirmed by analysis of the wear patterns established during erosion and endurance tests performed on the pump assembly 1 and by testing with different rotor and stator vane geometries.

The presence of the radial gap 27 is also significant in allowing the pump assembly 1 to be deployed with multiphase fluids. Sediment and debris contained within a fluid will get pumped through the assembly 1 along with the fluid when there is relative rotation between the rotor 3 and the stator 4. However, when the relative rotation is stopped the sediment and debris tends to congregate on the surfaces 30 and 31 of the rotor 3 and stator 4, respectively. In the absence of the radial gap 27 the sediment and debris quickly gets lodged between the rotor 3 and the stator 4 thus preventing further relative rotation between these components when the pump assembly 1 is reactivated. The presence of the radial gap 27 however significantly reduces the occurrence of the rotor 3 and the stator 4 jamming thus making the pump assembly 1 particularly well suited for use with a multiphase fluid. In addition, since the radial gap 27 can be increased to 10 mm and above multiphase fluids containing significantly larger debris particles can now be pumped without any significant deterioration in the pump efficiency.

The rotor 3 and the stator 4 may be formed from non-elastomeric materials thus reducing the pump assembly's vulnerability to heat and aromatics in crude oil as well as removing any limitations on the power that can be applied. For example the rotor 3 and the stator 4 may be made from metal, plastic or a ceramic material.

In practice the dimensions of the radial gap 27 are chosen depending on the fluid to be pumped. For example the gap is chosen to be of the order of 1.28 mm when compressing dry gas which comprises no liquid fraction whatsoever. The radial gap 27 may be increased up to 5 mm when compressing a gas with a liquid fraction of not less than 5% liquid at the pump inlet 12. Alternatively the radial gap 27 can be increased up to 10 mm when compressing and pumping gas with a liquid phase, a highly viscous fluid, a high solids content or large particles e.g. up to 10 mm in diameter. The radial gap 27 is preferably made greater than the maximum diameter of any particles or fragments of solid material (e.g. pebbles) expected to pass through the pump assembly 1.

Irrespective of the size of the radial gap 27 i.e. even when it is chosen just to provide a working clearance, it is found that the performance of the pump assembly 1 is also affected by a number of the other physical parameters of the above described components e.g. the cross-sectional area and length of the rotor channels 7 and the stator channels 8; the pitch and helix angle of the rotor vanes 5 and the stator vanes 6; and the overall length of the rotor and stator assembly 2.

The length and cross sectional areas of the channels 7 and 8 may be varied depending on the intended application of the pump assembly 1. It is preferably however for the ratio of the volume to cross sectional area of the channels 7 and 8 to be equal to, or greater than, 200 mm.

The helix formed by the rotor vanes 5 may have a mean lead angle ($\alpha$) that satisfies the following inequality:

$$60° \leq \alpha < 90° \quad (1)$$

It is however preferable for the mean lead angle ($\alpha$) to be in the range of 70° to 76°. In a preferred embodiment the mean lead angle is 73°.

In a similar manner, the helix formed by the stator vanes 6 may have a mean lead angle ($\beta$) that satisfies the following inequality:

$$60° \leq \beta < 90° \quad (2)$$

It is again preferable for the mean lead angle ($\beta$) to be in the range of 70° to 76°. In a preferred embodiment the mean lead angle ($\beta$) is 73°.

The ratio of the rotor vane height 24 to stator vane height 26 may be in the range of 1.1 to 20. In a preferred embodiment the ratio of the rotor vane height 24 to stator vane height 26 is 4.2.

The ratio of the rotor outer diameter 22 to the rotor lead (i.e. the distance progressed along the longitudinal axis when the rotor 3 rotates through 360°) may be in the range of 0.5 to 1.5. In a preferred embodiment the ratio of the rotor outer diameter 22 to the rotor lead is 1.0.

The ratio of the stator inner diameter 21 to the stator lead (i.e. the distance progressed along the stator 4 when the rotor 3 rotates through 360°) may be in the range of 0.5 to infinity i.e. the mean lead angle ($\beta$) of the stator tends towards 90°. In a preferred embodiment the ratio of the stator inner diameter 21 to the stator lead is 1.0.

FIG. 8 presents four performance curves illustrating the pump rate (or capacity) versus pressure differential (or head) across the pump of FIG. 3 at four different operating speeds, namely 2,000 rpm 32; 3,000 rpm 33; 4;000 rpm 34; and 4,800 rpm 35 for a pump in accordance with one of the preferred embodiments of the invention (as detailed above). The pump rate can be seen to be linearly proportional to the pressure differential across the pump for all of the pump speeds. As a result the pump assembly 1 permits effective pumping over a much wider range of speeds than for centrifugal pumping (conventional Electric Submersible Pumps, ESPs) or conventional PCPs. The pump assembly 1 has been extensively tested over the speed range 500 rpm-4,800 rpm with a wide range of fluids. In summary the pump assembly 1 is found to be robust and effective at 500 rpm (where operation at that speed is optimum for fluid conditions) and effective at up to 20,000 rpm where operation is optimum for high vapour fraction multiphase fluids. Operation at higher operating speeds is also beneficial where the radial gap 27 is significant or quite large and the density difference between the liquid phase and gas phase is quite small. In these circumstances the higher rotational speeds provide the assured fluid seal across the radial gap 27.

In practice the radial gap 27 between the rotor 3 and the stator 4 will be selected depending on the composition of the multiphase or high viscosity fluid that is required to be pumped. The pump assembly 1 is then operated at a speed that is optimised for the fluid conditions and which is sufficient to provide the fluid seal across the radial gap 27.

A number of features may also be included within the pump assembly 1 so as to increase its operational lifetime and further improve its performance. When the pump assembly 1 of FIG. 3 is employed to pump a fluid having a high sand content substantially along the z-axis, the pump wear surfaces that are found to be most affected are the stator forward facing vane faces 36 i.e. those faces perpendicular to the longitudinal axis and facing the direction of advance of the fluid. The corresponding rotor forward facing vane faces 37 are not affected to the same extent. Thus, it has been found to be beneficial for the operation of the pump assembly 1 for the stator vane thickness 25 to be greater than the rotor vane thickness 23. With such an arrangement the operational lifetime of the pump assembly 1 is increased since the greater susceptibility of the stator vanes 6 than the rotor vanes 5 to the effects of erosion are directly compensated for.

It is also been found to be beneficial for the operation of the pump assembly 1 for erosion resistant, corrosion resistant and/or drag resistant coatings to be employed on the surfaces of the rotor 3 and the stator 4. These will include coatings molecular scale diffusion into the substrate material (e.g. boronising, nitriding, etc) and coatings which are applied to the surface of the rotor and/or stator material. With respect to the pump assembly 1 of FIG. 3, particular improvement to the operational lifetime and performance is found when such coatings are applied to the surfaces 30 and 31 of the rotor 3 and stator 4, respectively.

With the above arrangement the erosion rates of the pump assembly 1 increase approximately linearly with rotation speed (i.e. not with rotational speed raised to the power 3 as evidenced by prior art pumps, e.g. ESPs). Therefore increased rotation speeds can be employed when pumping erosive fluids with the pump assembly 1 when compared with those pumps known in the art.

Variation in the ratio of the rotor vane height 24 to stator vane height 26 also provides somewhat unexpected and surprising results. Generally it is expected that the performance of a pump will decrease as the viscosity of the fluid it is employed to pump increases. This is particularly the case for centrifugal pumps, including ESPs and indeed such pump designs cease working altogether at viscosities around 2,000 cP and greater. Interesting results have however been achieved for pump assemblies 1 where the rotor vane height 24 is made greater than the stator vane height 26.

Figure 9A:
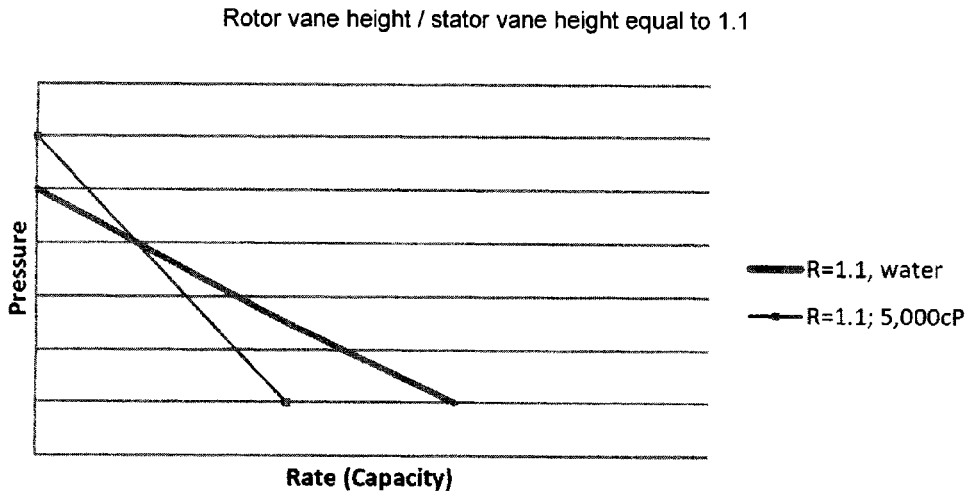
Figure 9B:
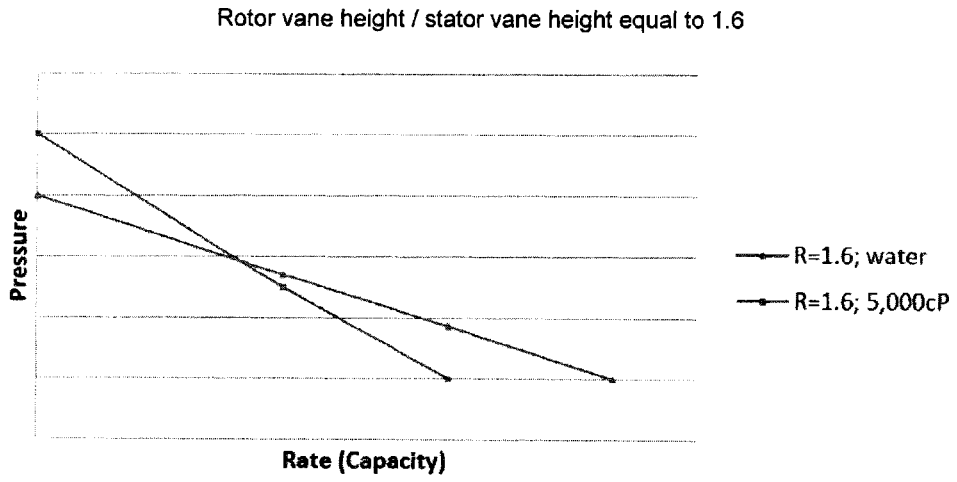

FIG. 9 presents graphs showing the performance curves for the pump assembly 1 when employed to pump water and a fluid having a viscosity of 5,000 cp. In particular, FIG. 9(a) presents results where the rotor vane height 24 to stator vane height 26 ratio is equal to 1.1 while in FIG. 9(b) this value equals 1.6. Although the graphs of FIGS. 9(a) and 9(b) show a falling off in pump performance this loss of performance is significantly slower than achieved with an ESP.

Figure 9C:
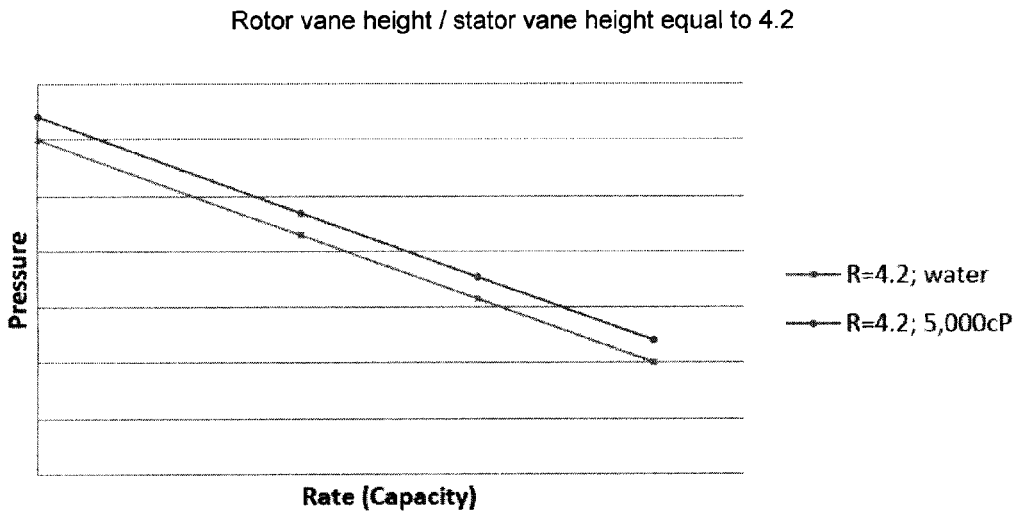

Furthermore, FIG. 9(c) presents the performance curve for a rotor vane height 24 to stator vane height 26 ratio equal to 4.2. Surprisingly, the gradient of the water curve and the 5,000 cp viscosity fluid are equal. With such an arrangement the performance of the pump assembly 1 is effectively independent of the viscosity of the fluid being pumped. Extensive testing has confirmed that this effect is provided when the rotor vane height 24 to stator vane height 26 ratio is 3.5 to 4.5 and it is anticipated that this effect will be maintained for even greater ratio values.

The pump assembly 1 has also been extensively tested with fluids exhibiting a dynamic viscosity of 0.001 pa.s (1 cP) to 6.5 pa.s (6,500 cP) to determine optimum design parameters. More limited testing with fluids exhibiting a dynamic viscosity between 10 pa.s (10,000 cP) and 20 pa.s (20,000 cP) has also been performed to demonstrate the effectiveness of the pump assembly 1 at these conditions. It is envisaged that the pump assembly 1 will be effective up to 200 pa. s (200,000 cP) where the effective dynamic viscosity of the fluid is the combined product of both viscous liquid and a high proportion of entrained solids (which significantly increases the effective viscosity).

The pump assembly 1 has also been tested and proved effective in an environment of highly viscous liquid with a high proportion of free gas. This is a surprising result due to the significant radial gap 27 present and is again explained by the presence of a fluid seal across the radial gap 27.

The NPSH (Net Positive Suction Head) of the pump assembly 1 is also surprising. The pump assembly 1 has been tested with a wide range of fluids and intake pressures both above and below atmospheric pressure without adverse effects on pump performance or pump reliability. These very low intake pressure conditions would generally cause severe and destructive vibration or stator elastomer break-up in ESPs and PCPs. The pump assembly 1 suffers no such problems. This particular characteristic provides the opportunity to employ the pump assembly 1 with a combination of pump technologies within certain applications so as to improve overall hydrocarbon well production rates.

A number of arrangements can be employed within the pump assembly 1 so as to compensate for the effects of volume reduction of the fluid due to the collapse of a gaseous phase. For example this may be achieved by varying the diameter of the central shaft 11 and rotor hub 3, or the rotor 24, and stator vane height 26 over the length of the assembly 1 as the pressure on the fluid is increased.

The flexibility of the pump assembly 1 is demonstrated by the fact that it can be configured so as to compress and pump a multiphase fluid having:

(a) a gas phase up to 95%;
(b) a liquid phase up to 100%;
(c) a highly viscous phase up to 100% and preferably 1,000-10,000 cP;
(d) a steam vapour phase up to 95%;
(e) an entrained solids (sand, scale, organic deposits) content of 1%-5% by weight and up to 60% solids;
(f) a combination of viscous phase, solids and water emulsion with effective viscosity up to 200,000 cP.

The embodiment in FIG. 10 shows a multistage pump assembly 1b (and when operated in reverse, a multistage motor) according to an alternative embodiment of the invention. In this embodiment the multistage pump assembly 1b comprises an array of rotor and stator assemblies 2 which are vertically spaced from one another by intermediate bearings comprising a spider bearing 38 through which the fluid can pass and a thrust bearings 39. Fluid is pumped through an outer tube 40 by rotation of the rotors 3. Alternatively, if the array is to be used as a motor, fluid can be driven through the tube 40 in order to drive rotation of the rotors 3 relative to the stators 4.

It will be appreciated that further alternative pump or motor designs may be constructed that comprise multiple rotor and stator assemblies 2. For example, a group of one or more rotor and stator assemblies 2 may be deployed on alternative sides of a central aperture. An example embodiment of a multistage pump 1c is provided in FIG. 12. It can be seen that two rotor and stator assemblies 2 are located on opposite sides of a central aperture 41. An additional aperture 42 in the housing provides a means for fluid communication between the central aperture 41 and the rotor and stator assemblies 2. Fluid may therefore be drawn in through the central aperture 41 and pumped to outlets located at opposite ends of the device.

Alternatively, a multistage pump 1d may be provided where the rotor and stator assemblies 2 of the array may comprise variable diameters, as shown in FIG. 12. In this embodiment the multistage pump 1d acts to compensate for the effects of volume reduction due to the collapse of a gaseous phase as the pressure on the fluid is increased.

The above described embodiments of the invention are not limited to subsea or downhole use, but can be used on surface or on seabed as a pump or motor assembly or located in a conventional oilfield tubular. The assembly of rotors can be mounted horizontally, vertically or in any suitable configuration. Further embodiments of the invention can be surface or terrestrial mounted and can operate as pump and motor assemblies.

The pump assembly may be deployed in conjunction with any other type of pump or compressor to enhance the performance or operability of that pump or compressor or to increase well production rate.

In summary, the pump assembly 1 offers a number of significant advantages when compared to those pumps known in the art. In particular, the pump assembly is effective, reliable and designed to withstand all such application and extreme environments associated with multiphase fluids and particularly those found within the field of hydrocarbon exploration.

The pump assembly 1 can provide compression performance similar to those of simple single helix axial multiphase pumps, but exhibits:

- higher pump efficiencies; greater tolerance levels of solids;
- reduced wear due to the presence of solids;
- a pump performance that is maintained even in the presence of large radial gap;
- an extraordinary tolerance of very low intake pressure;
- a wider useful operating range of rotational speeds; and
- a greater design flexibility so as to meet a wider range of working conditions.

A pump assembly comprising a stator and a rotor having vanes of opposite handed thread arrangements is described. A radial gap is located between the stator vanes and the rotor vanes such that rotation of the rotor causes the stator and rotor to co-operate to provide a system for moving fluid longitudinally between them. The operation of the pump results in a fluid seal being is formed across the radial gap. The described apparatus can also be operated as a motor assembly when a fluid is directed to move longitudinally between the stator and rotor. The presence of the fluid seal results in no deterioration of the pump or motor efficiency, even when the radial gap is significantly greater than normal working clearance values. Furthermore, the presence of the radial gap makes the pump/motor assembly ideal for deployment with high viscosity and/or multiphase fluids.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

1 Pump Assembly / Motor Assembly
2 Rotor And Stator Assembly
3 Rotor
4 Stator
5 Rotor Vanes
6 Stator Vanes
7 Rotor Channels
8 Stator Channels
9 Anti-Rotation Tabs
10 Cylindrical Housing
11 Central Shaft
12 Inlet
13 Outlet
14 Bearing
15 Outer Shell
16 Bearing Hub
17 Support Vanes
18 Central Support Hub
19 Stationary Bushing
20 Rotating Bushing
21 Internal Diameter Of The Of The Stator Vanes
22 Outer Diameter Of The Rotor vanes
23 Rotor Vane Thickness
24 Rotor Vane Height
25 Stator Vane Thickness
26 Stator Vane Height
27 Radial Gap
28 Fluid Flow Paths
29 Tangential Flow Component
30 Rotor Erosion Wear Surfaces
31 Stator Erosion Wear Surfaces
32 2,000 Rpm Curve
33 3,000 Rpm Curve
34 4,000 Rpm Curve
35 4,800 Rpm Curve
36 Stator Forward Facing Vane Faces
37 Rotor Forward Facing Vane Faces
38 Spider Bearing
39 Thrust Bearing
40 Outer Tube (pump housing)
41 Central Aperture
42 Housing Aperture

The invention claimed is:

1. A pump assembly for use with a high viscosity or multiphase hydrocarbon fluid comprising:

a stator having an internal surface of constant diameter and one or more stator vanes extending from the internal surface to a constant stator vane radial height along a length of the stator; and a rotor having an external surface of constant diameter and one or more rotor vanes extending from the external surface to a constant rotor vane radial height along a length of the rotor, wherein the one or more stator vanes have an opposite handed thread with respect to a thread of the one or more rotor vanes [and], *wherein* the stator and rotor [co-operating] *cooperate* to [provide], on rotation of the rotor, [a system for moving] *move* the high viscosity or multiphase hydrocarbon fluid longitudinally between [them] *the stator and the rotor*, wherein a radial gap, having a [constant value] *gap width* in the range of [1.28] *greater than 0.254* mm to 10 mm, is located between the constant stator vane radial height and the constant rotor vane radial height along a length of the pump assembly, [and]

wherein *the constant rotor vane radial height is greater than the constant stator vane radial height, and* a ratio of the constant rotor vane radial height to the constant stator vane radial height has a constant value in the range of [1.1 to 20] *3.5 to 4.5* along the length of the pump assembly,

*a helix formed by the one or more rotor vanes has a mean lead angle* (α) *that is greater than 60° but less than 90°, and a helix formed by the one or more stator vanes has a mean lead angle* (β) *that is greater than 60° but less than 90°,*

*the one or more stator vanes further comprises a stator vane thickness, and the one or more rotor vane further comprises a rotor vane thickness, and the stator vane thickness is greater than the rotor vane thickness along the length of the pump assembly.*

2. A pump assembly as claimed in claim 1 wherein the *one or more* rotor vanes are arranged on the external surface of the rotor so as to form one or more rotor channels.

[3. A pump assembly as claimed in claim 2 wherein a ratio of the volume to cross sectional area of the rotor channels is equal to, or greater than, 200 mm.]

4. A pump assembly as claimed in claim 1 wherein the *one or more* stator vanes are arranged on the internal surface of the stator so as to form one or more stator channels.

[5. A pump assembly as claimed in claim 4 wherein a ratio of the volume to cross sectional area of the stator channels is equal to, or greater than, 200 mm.]

[6. A pump assembly as claimed in claim 1 wherein a helix formed by the rotor vanes has a mean lead angle (α) that is greater than 60° but less than 90°.]

[7. A pump assembly as claimed in claim 6 wherein the mean lead angle (α) is in the range of 70° to 76°.]

[8. A pump assembly as claimed in claim 7 wherein the mean lead angle (α) is 73°.]

[9. A pump assembly as claimed in claim 1 wherein a helix formed by the stator vanes has a mean lead angle (β) that is greater than 60° but less than 90°.]

[10. A pump assembly as claimed in claim 9 wherein the mean lead angle (β) is in the range of 70° to 76°.]

[11. A pump assembly as claimed in claim 10 wherein the mean lead angle (β) is 73°.]

[12. A pump assembly as claimed in claim 1 wherein the ratio of the constant rotor vane radial height to the constant stator vane radial height is in the range 3.5 to 4.5.]

[13. A pump assembly as claimed in claim 1 wherein the ratio of the constant rotor vane radial height to the constant stator vane radial height is 4.2.]

[14. A pump assembly as claimed in claim 1 wherein a ratio of a rotor outer diameter to a rotor lead is in the range of 0.5 to 1.5.]

[15. A pump assembly as claimed in claim 14 wherein the ratio of the rotor outer diameter to the rotor lead is 1.0.]

[16. A pump assembly as claimed in claim 1 wherein a ratio of a stator inner diameter to a stator lead is in the range of 0.5 to infinity.]

[17. A pump assembly as claimed in claim 16 wherein the ratio of the stator inner diameter to the stator lead is 1.0.]

18. A pump assembly as claimed in claim 1 wherein one or more anti-rotation tabs are located at each end of the stator.

19. A pump assembly as claimed in claim 1 wherein the *pump* assembly further comprises a cylindrical housing within which the rotor and stator are located.

20. A pump assembly as claimed in claim 1 wherein the rotor is connected to a motor by means of a central shaft such that operation of the motor induces relative rotation between the rotor and the stator.

[21. A pump assembly as claimed in any claim 1 wherein the assembly further comprises a first bearing which defines an inlet for the device.]

22. A pump assembly as claimed in claim [21] *1*wherein the *pump* assembly further comprises a [second] bearing[, longitudinally spaced from the first bearing, which defines an outlet for the device].

[23. A pump assembly as claimed in claim 1 wherein a stator vane thickness is greater than a rotor vane thickness.]

24. A pump assembly as claimed in claim 1 wherein the rotor is coated with an erosion resistant, corrosion resistant and/ or drag resistant coating.

25. A pump assembly as claimed in claim 1 wherein the stator is coated with an erosion resistant, corrosion resistant and/ or drag resistant coating.

[26. A multistage pump wherein the multistage pump comprises two or more pump assemblies, and wherein at least one of the two or more pump assemblies comprises:

a stator having an internal surface of constant diameter and one or more stator vanes extending from the internal surface to a constant stator vane radial height along the length of the stator; and a rotor having an external surface of constant diameter and one or more rotor vanes extending from the external surface to a constant rotor vane radial height along the length of the rotor, wherein the one or more stator vanes have an opposite handed thread with respect to the thread of the one or more rotor vanes and the stator and rotor cooperating to provide, on rotation of the rotor, a system for moving a high viscosity or multiphase hydrocarbon fluid longitudinally between them;

wherein a radial gap, having a constant value in the range of 1.28 mm to 10 mm, is located between the constant stator vane radial height and the constant rotor vane radial height along a length of the pump assembly, and a ratio of the constant rotor vane radial height to the constant stator vane radial height has a constant value in the range of 1.1 to 20 along the length of the pump assembly.]

[27. A multistage pump as claimed in claim 26 wherein the two or more pump assemblies are deployed on opposite sides of a central inlet aperture.]

[28. A multistage pump as claimed in claim 26 wherein the diameter of the two or more pump assemblies differs along the length of the multistage pump.]

[29. A motor assembly for use with a high viscosity and or multiphase hydrocarbon fluid comprising:

a stator having an internal surface of constant diameter and one or more stator vanes extending from the internal surface to a constant stator vane radial height along a length of the stator; and a rotor having an external surface of constant diameter and one or more rotor vanes extending from the external surface to a constant rotor vane radial height along a length of the rotor, wherein the one or more stator vanes have an opposite handed thread with respect to the thread of the one or more rotor vanes and the stator and rotor cooperating to provide, on the high viscosity or multiphase hydrocarbon fluid moving longitudinally between them, relative rotation of the rotor and stator, wherein a radial gap, having a constant value in the range of 1.28 mm to 10 mm, is located between the constant stator vane radial height and the constant rotor vane radial height along a length of the motor assembly, and a ratio of the constant rotor vane radial height to the constant stator vane radial height has a constant value in the range of 1.1 to 20 along the length of the motor assembly.]

[30. A multistage motor wherein the multistage motor comprises two or more motor assemblies, wherein at least one of the two motor assemblies comprises:

a stator having an internal surface of constant diameter and one or more stator vanes extending from the internal surface to a constant stator vane radial height along a length of the stator; and a rotor having an external surface of constant diameter and one or more rotor vanes extending from the external surface to a constant rotor vane radial height along a length of the rotor, wherein the one or more stator vanes have an opposite handed thread with respect to the thread of the one or more rotor vanes and the stator and rotor co-operating to provide, on a high viscosity or multiphase hydrocarbon fluid moving longitudinally between them, relative rotation of the rotor and stator, wherein a radial gap, having a constant value in the range of 1.28 mm to 10 mm, is located between the constant stator vane radial height and the constant rotor vane radial height along a length of the motor assembly, and a ratio of the constant rotor vane radial height to the constant stator vane radial height has a constant value in the range of 1.1 to 20 along the length of the motor assembly.]

[31. A multistage motor as claimed in claim 30 wherein the two or more motor assemblies are deployed on opposite sides of a central inlet aperture.]

[32. A pump assembly for use with a high viscosity or multiphase hydrocarbon fluid comprising a stator and a rotor, each one being provided with one or more vanes having an opposite handed thread with respect to a thread of the one or more vanes on the other, the stator and rotor co-operating to provide, on rotation of the rotor, a system for moving the high viscosity or multiphase hydrocarbon fluid longitudinally between them, wherein: a radial gap, in the range of 1.28 mm to 10 mm, is located between the one or more stator vanes and the one or more rotor vanes along a length of the pump assembly, and a ratio of a radial height of the one or more rotor vanes to a radial height of the one or more stator vanes is in the range of 3.5 to 4.5 along the length of the pump assembly.]

*33. A method of producing a hydrocarbonaceous fluid, the method comprising:*

*deploying a pump assembly to a predetermined depth within a tubular disposed in a wellbore, the pump assembly comprising:*

*a stator configured with an at least one helically wound stator vane disposed on a constant diameter inner stator surface, the at least one stator vane further comprising a stator vane length, a constant stator vane height, and a stator vane thickness;*

*a rotor configured with an at least one helically wound rotor vane disposed on a constant diameter outer rotor surface, the at least one rotor vane further comprising a rotor vane length, a constant rotor vane height, and a rotor vane thickness,*

*wherein the at least one stator vane and the at least one rotor vane are separated by a radial gap having a gap width in the range of greater than 0.254 mm to 10 mm along the stator vane length and the rotor vane length,*

*wherein the constant rotor vane height is greater than the constant stator vane height, and a ratio of the constant rotor vane height to the constant stator vane height is a constant value in the range of 3.5 to 4.5 along the rotor vane length and the stator vane length,*

*wherein the at least one helically wound rotor vane comprises a rotor helix having a mean rotor lead angle in the range of 60 degrees and 90 degrees, wherein the at least one helically wound stator vane comprises a stator helix having a mean stator lead angle in a range of 60 degrees to 90 degrees, wherein the stator vane thickness is greater than the rotor vane thickness respectively along the length of the pump assembly;*

*operating the pump assembly in a manner that aids in production of the hydrocarbonaceous fluid from the wellbore to a surface,*

*wherein the operating speed is in the range of 500 rpm to 20,000 rpm, and wherein the wellbore fluid comprises at least one of:*

*(a) a gas phase of up to 95%;*

*(b) a liquid phase of up to 100%;*

*(c) a highly viscous phase up to 100% having the characteristic of a viscosity in the range of 1,000 to 10,000 cP;*

*(d) a steam vapor phase up to 95%; and*

*(e) an entrained solids content of about 1% to about 5% by weight and up to 60% solids; and*

*(f) combinations thereof.*

* * * * *